(12) United States Patent
Kato

(10) Patent No.: US 10,393,295 B2
(45) Date of Patent: Aug. 27, 2019

(54) PIPE CONNECTION STRUCTURE

(71) Applicant: TOYOTA JIDOSHA KABUSHIKI KAISHA, Toyota-shi, Aichi-ken (JP)

(72) Inventor: Yoshikazu Kato, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 177 days.

(21) Appl. No.: 15/314,668

(22) PCT Filed: Jun. 5, 2015

(86) PCT No.: PCT/IB2015/000832
§ 371 (c)(1),
(2) Date: Nov. 29, 2016

(87) PCT Pub. No.: WO2015/189670
PCT Pub. Date: Dec. 17, 2015

(65) Prior Publication Data
US 2018/0106402 A1  Apr. 19, 2018

(30) Foreign Application Priority Data
Jun. 10, 2014  (JP) .................................. 2014-119757

(51) Int. Cl.
*F16L 19/06* (2006.01)
*F16L 19/02* (2006.01)
(Continued)

(52) U.S. Cl.
CPC ............ *F16L 19/06* (2013.01); *F02M 55/005* (2013.01); *F16L 19/028* (2013.01);
(Continued)

(58) Field of Classification Search
CPC ...... F16L 19/028; F16L 19/0286; F16L 19/06; F16L 19/0283
See application file for complete search history.

(56) References Cited

U.S. PATENT DOCUMENTS

| 1,363,181 A | 12/1920 | Henger | |
| 2,748,463 A * | 6/1956 | Mueller | F16L 19/028 29/421.1 |

(Continued)

FOREIGN PATENT DOCUMENTS

| FR | 2464424 A1 * | 3/1981 | ............ F16L 19/028 |
| JP | S57-114167 U | 7/1982 | |

(Continued)

*Primary Examiner* — David Bochna
(74) *Attorney, Agent, or Firm* — Oliff PLC

(57) ABSTRACT

A pipe connection structure according to one aspect of the invention is provided. The pipe connection structure includes a first pipe member and a second pipe member. A sealing portion of the first pipe member includes a first abutment surface in a tapered shape, a diameter of which is increased toward a tip of the first pipe member. An end of the second pipe member includes a second abutment surface in a tapered shape, a diameter of which is reduced toward a tip of the second pipe member. The second abutment surface is pressed and abuts against the first abutment surface. An abutment section of the second abutment surface and the first abutment surface is located on a radially inner side of an inner wall surface of the first pipe member.

4 Claims, 5 Drawing Sheets

(51) Int. Cl.
*F16L 19/028* (2006.01)
*F02M 55/00* (2006.01)
*F02M 59/02* (2006.01)

(52) U.S. Cl.
CPC .......... *F16L 19/0225* (2013.01); *F02M 59/02* (2013.01); *F02M 2200/8053* (2013.01); *F16L 19/0283* (2013.01)

(56) References Cited

U.S. PATENT DOCUMENTS

| | | | | |
|---|---|---|---|---|
| 2,862,732 | A * | 12/1958 | Guillou | F16L 19/0206 285/342 |
| 3,191,973 | A * | 6/1965 | Guarnaschelli | F16L 19/025 285/110 |
| 3,216,748 | A * | 11/1965 | Gunberg | F16L 19/06 285/116 |
| 5,002,316 | A * | 3/1991 | Chohan | F16L 19/0225 285/110 |
| 5,314,211 | A * | 5/1994 | Landhuis | F16L 19/0225 285/110 |
| 6,296,283 | B1 * | 10/2001 | Dietzel | F16L 33/2076 285/256 |
| 8,292,334 | B2 * | 10/2012 | Knight | F16L 19/028 285/382.4 |
| 2002/0192092 | A1 | 12/2002 | Mori | |
| 2007/0125541 | A1 * | 6/2007 | Bull | F16L 19/028 166/305.1 |
| 2008/0012324 | A1 | 1/2008 | Dole et al. | |

FOREIGN PATENT DOCUMENTS

| | | |
|---|---|---|
| JP | 2003-214570 A | 7/2003 |
| JP | 2007-077807 A | 3/2007 |
| JP | 2010-164089 A | 7/2010 |
| JP | 2011-106303 A | 6/2011 |
| JP | 2012-184794 A | 9/2012 |

* cited by examiner

PIPE CONNECTION STRUCTURE

BACKGROUND OF THE INVENTION

1. Field of the Invention

The invention relates to a pipe connection structure of a fuel pipe in an internal combustion engine (an engine) or the like.

2. Description of Related Art

In one of structures for connecting fuel pipes (made of metal) in an internal combustion engine, the fuel pipes are brought into press-contact with each other. In the structure, one of the two fuel pipes to be connected (hereinafter, simply referred to as "pipes") is formed with a male screw (an outer screw) on an outer peripheral surface at an end thereof, and the other of the pipes is provided with a rotatable cap nut. The cap nut is screwed into the outer screw, so as to press-fit ends of the two pipes to each other. In this way, the above two pipes are connected. Such a pipe connection structure is adopted in Japanese Patent Application Publication No. 2007-077807 (JP 2007-077807 A), for example. Further, as such a pipe connection structure, a structure that a seat member (made of copper, for example) softer than a pipe material is interposed between the ends of the two pipes to be connected is also suggested (for example, see Japanese Patent Application Publication No. 2010-164089 (JP 2010-164089 A)).

SUMMARY OF THE INVENTION

In a pipe connection structure in which the ends of the two pipes (made of metal) are pressed against each other for connection, if a contact area of a connected portion is increased, surface pressure may be lowered, and certainty of sealing may consequently be degraded. A cause of a reduction in the surface pressure includes generation of plastic deformation of an abutted portion at the pipe ends due to a fluctuation in pressure, a fluctuation in temperature, or the like.

It should be noted that, according to the pipe connection structure described in JP 2010-164089 A above, the plastic deformation at the pipe end can be suppressed by interposing the soft seat member between the ends of the two pipes to be connected. However, if a fluctuation in axial force is repeated by the fluctuation in pressure, the fluctuation in temperature, or the like, the plastic deformation, such as a dent, may be generated in an abutment section (a portion against which the pipe end abuts) of the seat member. As a result, the surface pressure of the abutment section may be lowered, and the certainty of sealing may consequently be degraded.

The invention provides a pipe connection structure that can suppress degradation of certainty of sealing.

A pipe connection structure according to one aspect of the invention is provided. The pipe connection structure includes a first pipe member and a second pipe member. An sealing portion of the first pipe member includes a first abutment surface in a tapered shape, a diameter of which is increased toward a tip of the first pipe member. The sealing portion is projected radially inward from an adjacent inner wall surface of the first pipe member. An end of the second pipe member includes a second abutment surface in a tapered shape, a diameter of which is reduced toward a tip of the second pipe member, and the second abutment surface is pressed and abuts against the first abutment surface. An abutment section between the second abutment surface and the first abutment surface is located on the radially inner side of the inner wall surface of the first pipe member.

According to the pipe connection structure according to the above aspect, the first pipe member and the second pipe member are pressed in an axial direction by pressing means, and the sealing portion of the first pipe member is deflected due to elastic deformation. This is because the sealing portion projects radially inward from the inner wall surface of the first pipe member and also because each of the first abutment surface and the second abutment surface is formed as a tapered surface. The sealing portion is elastically deformed. Thus, even when an axial force is fluctuated due to a fluctuation in pressure, a fluctuation in temperature, or the like, the fluctuation in axial force and a fluctuation in surface pressure of the abutment section are absorbed by elasticity (a spring effect) of the sealing portion. Therefore, plastic deformation of the sealing portion and plastic deformation of the end of the second pipe member can be suppressed, and lowering of the surface pressure of the abutment section between these first pipe member and second pipe member can be suppressed.

In the pipe connecting structure according to the above aspect, the sealing portion may be annular.

In the pipe connection structure according to the above aspect, the first pipe member and the sealing portion may be constructed as a single piece. When the sealing portion is integrally formed with the first pipe member, just as described, the above-described operational effect can be achieved only by changing a shape of the first pipe member. Moreover, since an additional component is not necessary, cost can be reduced.

In the pipe connection structure according to the above aspect, the sealing portion may include: a pressure receiving seat section including the first abutment surface and abutting against the second abutment surface; an apex section being a radially innermost section of the sealing portion, and the apex section being adjacent to the pressure receiving seat section; and a joint section being adjacent to the apex section, located on a side opposite to the pressure receiving seat section across the apex section. Furthermore, the joint section may have a tapered shape, a diameter of which is increased in a direction away from the apex section. Since the joint section of the sealing portion has the tapered shape, just as described, the sealing portion can easily be processed.

In the pipe connection structure according to the above aspect, an angle defined by the joint section and the inner wall surface of the first pipe member may be an obtuse angle.

In the pipe connection structure according to the above aspect, the sealing portion may include: the pressure receiving seat section including the first abutment surface and abutting against the second abutment surface; the apex section being a radially innermost section of the sealing portion, and the apex section being adjacent to the pressure receiving seat section; and the joint section being adjacent to the apex section, located on the side opposite to the pressure receiving seat section across the apex section. Furthermore, the joint section may be located perpendicularly to the inner wall surface of the first pipe member. By adopting such a configuration, an amount of deflection of the sealing portion (an amount of displacement of the abutment surface) can be increased.

In the pipe connection structure according to the above aspect, the sealing portion may include: the pressure receiving seat section including the first) abutment surface and abutting against the second abutment surface; the apex section being a radially innermost section of the sealing portion, and the apex section being adjacent to the pressure receiving seat section; and the joint section being adjacent to the apex section, located on the side opposite to the pressure receiving seat section across the apex section. Furthermore, the joint section may have an inclined shape from the inner wall surface of the first pipe member toward the apex section. By adopting such a configuration, an amount of deflection of the sealing portion (an amount of displacement of the abutment surface) can be increased.

In the pipe connecting structure according to the above aspect, an angle defined by the joint section and the inner wall surface of the first pipe member may be an acute angle.

The pipe connection structure according to the above aspect can effectively be used for connection of a high-pressure fuel pump. More specifically, the first pipe member is a discharge port of a high-pressure fuel pump used for an engine of in-cylinder direct-injection type, and the second pipe member is a high-pressure fuel pipe for connecting the discharge port and a delivery pipe. Then, the pipe connection structure of the invention is applied to pipe connection of these discharge port and high-pressure fuel pipe. In this way, certainty of sealing of the fuel pipe, of which pressure becomes high due to in-cylinder injection, can be improved.

According to the pipe connection structure according to the above aspect, lowering of surface pressure of the abutment section due to a fluctuation in pressure, a fluctuation in temperature, or the like can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will hereinafter be made on an embodiment of the invention on the basis of the drawings.

Figure 1:
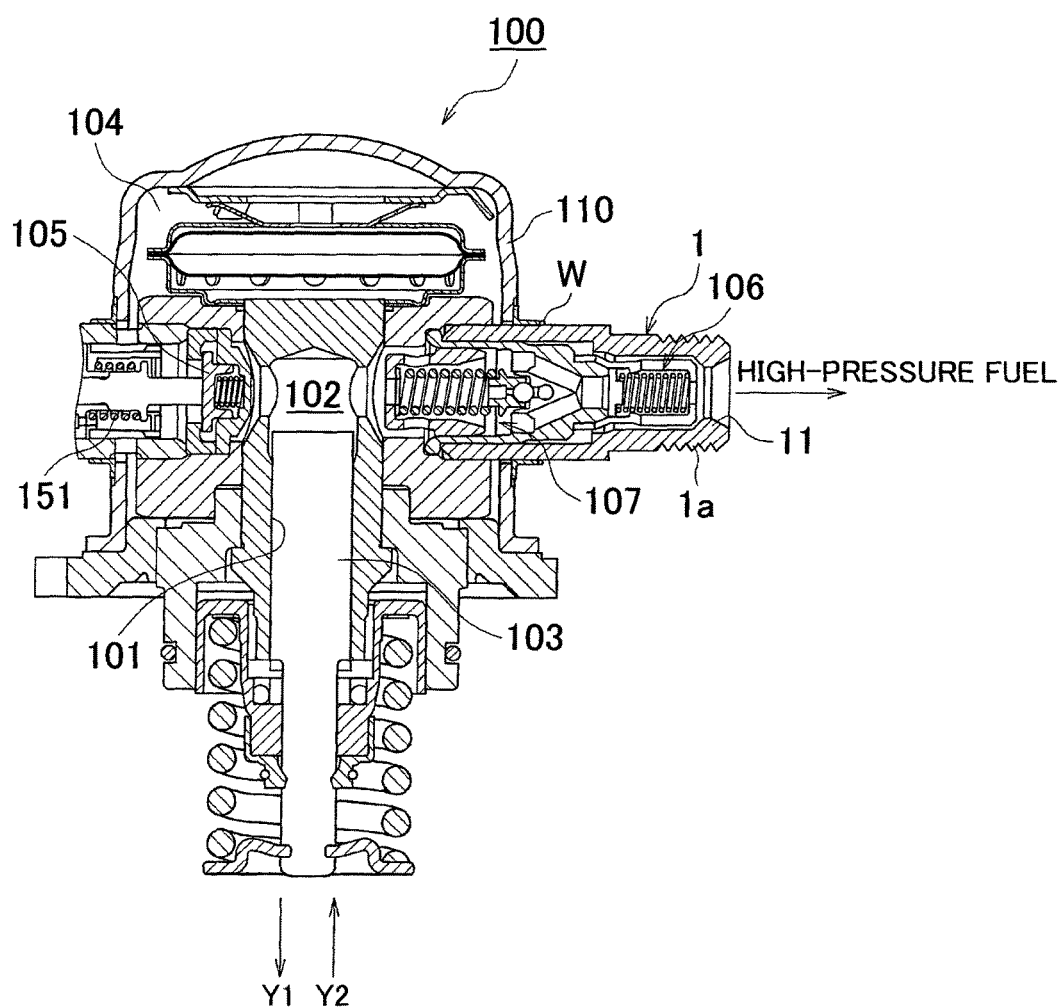
FIG. 1 is an example of a sectional view of a high-pressure fuel pump, for which a pipe connection structure of the invention is adopted.

—High-Pressure Fuel Pump—First, a description will be made on a high-pressure fuel pump to which a pipe connection structure of the invention is applied, with reference to FIG. 1.

A high-pressure fuel pump 100 of this example is a fuel pump that is provided in a fuel supply passage of an engine of in-cylinder direct-injection type (hereinafter, also referred to as an engine). The high-pressure fuel pump 100 includes a cylinder 101, a pressurizing chamber (a high-pressure chamber) 102, a plunger (a pump piston) 103, a fuel supply chamber 104, a solenoid spill valve 105, a check valve 106, a relief valve 107, a discharge port 1, and the like.

The plunger 103 is driven by rotation of a cam (not shown) that is attached to an intake cam shaft of the engine, and reciprocates in the cylinder 101. A volume of the pressurizing chamber 102 is increased or reduced by reciprocating movement of this plunger 103.

The pressurizing chamber 102 is defined by the plunger 103 and the cylinder 101. The pressurizing chamber 102 is connected to the fuel supply chamber 104 via the solenoid spill valve 105. Further, the pressurizing chamber 102 communicates with the discharge port 1, and a high-pressure fuel pipe 2 (see FIG. 2 and the like) is connected to this discharge port 1. The high-pressure fuel pipe 2 communicates with a delivery pipe (not shown), and a fuel injection valve (for in-cylinder injection: not shown) is connected to the delivery pipe. It should be noted that the discharge port 1 is attached to a pump housing 110 by welding (see a welded section W in FIG. 1).

The solenoid spill valve 105 is provided to communicate between the fuel supply chamber 104 and the pressurizing chamber 102 or block the fuel supply chamber 104 and the pressurizing chamber 102 from each other. The solenoid spill valve 105 includes an electromagnetic solenoid (not shown), and is operatively opened/closed by controlling energization to the electromagnetic solenoid.

In the high-pressure fuel pump 100 with the above-described structure, when the electromagnetic solenoid is not energized, the solenoid spill valve 105 is opened by an elastic force of a compression coil spring 151. If the plunger 103 moves in a Y1 direction in this state, fuel (low-pressure fuel) in the fuel supply chamber 104 is suctioned into the pressurizing chamber 102 (a suctioning process). Meanwhile, if the solenoid spill valve 105 is closed against the elastic force of the compression coil spring 151 due to the energization to the electromagnetic solenoid while the plunger 103 moves in a Y2 direction (a pressurizing process), the check valve 106 is opened at a time point that fuel pressure in the pressurizing chamber 102 reaches a specified value, and high-pressure fuel is discharged toward the delivery pipe through the discharge port 1 and the high-pressure fuel pipe 2.

—Pipe Connection Structure—Next, a description will be made on a connection structure (a pipe connection structure) of the discharge port 1 (a first pipe member) and the high-pressure fuel pipe 2 (a second pipe member) of the high-pressure fuel pump 100 with reference to FIG. 2 to FIG. 4.

(Discharge port) First, a description will be made on a structure of the discharge port 1. An outer diameter of the discharge port 1 is larger than an outer diameter of a straight pipe section 2a of the high-pressure fuel pipe 2, which will be described below. A male screw 1a is formed on an outer peripheral surface at an end (of a connection side) of the discharge port 1. A fastening nut 3, which will be described below, is screwed into this male screw 1a.

An inner wall surface 1b of the discharge port 1 is integrally formed with an annular sealing portion 11, that projects radially inward from the inner wall surface 1b of the discharge port 1. The sealing portion 11 includes: a pressure receiving seat section 11a being located at an opening end of the discharge port 1; an apex section 11b being a radially innermost section of the sealing portion 11, and the apex section 11b being adjacent to the pressure receiving section 11a; and a joint section 11c adjacent to the apex section 11b and located on a side opposite to the pressure receiving seat section 11a across the apex section 11b.

The pressure receiving seat section 11a is processed in a conical tapered shape in which a diameter thereof is reduced toward an X1 direction. The pressure receiving seat section 11a is processed so as to have a shape and dimensions that allow the pressure receiving seat section 11a to abut against an end of a pressing section 21a of the high-pressure fuel pipe 2, which will be described below. The pressure receiving seat section 11a includes a first abutment surface Sa1 of the discharge port 1. The first abutment surface Sa1 has a tapered shape in which a diameter thereof is increased toward a tip (of a connected side) of the discharge port 1 (see FIG. 2 and the like).

Figure 4:
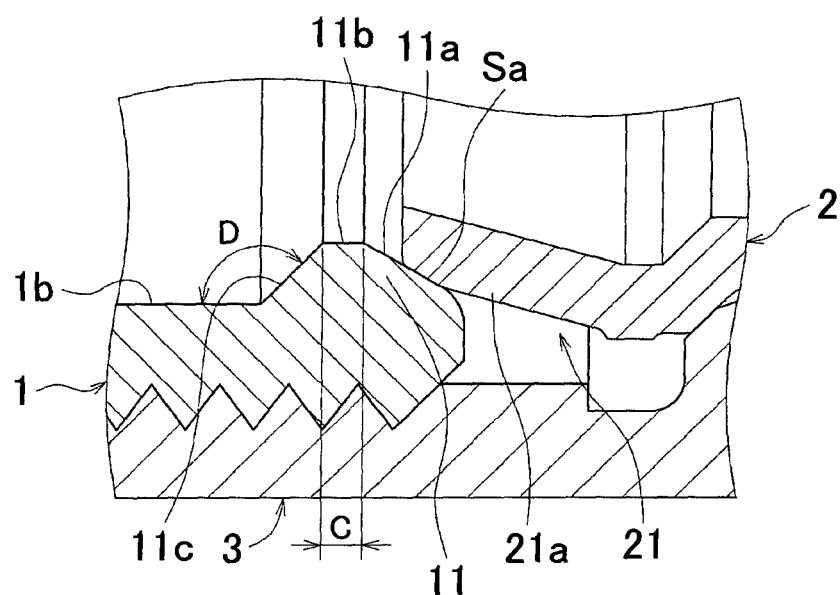
FIG. 4 is an enlarged sectional view of the main components in the pipe connection structure of FIG. 2.

The apex section 11b is a radially innermost section of the sealing portion 11 and has a specified width C (see FIG. 4). The joint section 11c is processed to have a conical tapered shape in which a diameter thereof is increased to the outer side (the outer diameter side) toward the X1 direction.

It should be noted that, in the embodiment, a material that has an excellent plastic workability and favorable weldability (for example, SUS403J1L) is used as a material of the discharge port 1.

(High-pressure fuel pipe) Next, a description will be made on a structure of the high-pressure fuel pipe 2. A connection head section 21 is provided at an end (of a connection side) of the high-pressure fuel pipe 2. The connection head section 21 has: a nut seat section 21b that has a larger outer diameter than the outer diameter of the straight pipe section 2a of the high-pressure fuel pipe 2; and the pressing section 21a, an outer diameter of which is gradually reduced at a tip side to be smaller than that of the nut seat section 21b. The end (a second abutment surface Sa2) of this pressing section 21a abuts against the pressure receiving seat section 11a at the sealing portion 11 of the discharge port 1. This second abutment surface Sa2 of the high-pressure fuel pipe 2 has a tapered shape in which a diameter thereof is reduced toward a tip (a connected-side tip) of the high-pressure fuel pipe 2 (see FIG. 2 and the like).

(Fastening nut) The fastening nut (a cap nut) 3 has: a cylindrical section 31; and an inner flange section 32 that is integrally formed at an end of this cylindrical section 31. An inner peripheral surface of the cylindrical section 31 is formed with a female screw 3a that can mesh with the male screw 1a on the outer peripheral surface of the discharge port 1. A central section of the inner flange section 32 is provided with a through hole 33, through which the straight pipe section 2a of the high-pressure fuel pipe 2 is inserted. An inner diameter of this through hole 33 is set to have a diameter that is larger than the outer diameter of the straight pipe section 2a of the high-pressure fuel pipe 2 and is smaller than the outer diameter of the nut seat section 21b of the connection head section 21. Accordingly, the straight pipe section 2a of the high-pressure fuel pipe 2 can be inserted through the through hole 33 of the fastening nut 3. In a state that the straight pipe section 2a is inserted into the fastening nut 3, the fastening nut 3 can make relative rotation to the high-pressure fuel pipe 2 (can rotate about the pipe axis) and can also make relative rotation in the pipe axial direction. In addition, when the fastening nut 3 moves to the tip side of the high-pressure fuel pipe 2 (in the X1 direction), the inner flange section 32 of the fastening nut 3 abuts against the nut seat section 21b of the connection head section 21 of the high-pressure fuel pipe 2. From a time point of this abutment, the high-pressure fuel pipe 2 moves in conjunction with a movement of the fastening nut 3 in the pipe axial direction (the X1 direction).

The above-described pipe connection between the discharge port 1 and the high-pressure fuel pipe 2 is performed as follows.

(1) First, the fastening nut 3 is inserted through the straight pipe section 2a of the high-pressure fuel pipe 2, and the fastening nut 3 is arranged on the connection head section 21 side.

(2) In a state that the pressure receiving seat section 11a of the discharge port 1 faces the connection head section 21 of the high-pressure fuel pipe 2, the fastening nut 3 (the female screw 3a) starts being screwed into the male screw 1a on the outer peripheral surface of the discharge port 1. In this screwing process, the high-pressure fuel pipe 2 and the discharge port 1 move relative to each other in the pipe axial direction (move in directions to approach each other), and the end of the high-pressure fuel pipe 2 (the end of the pressing section 21a) comes in contact with the pressure receiving seat section 11a of the discharge port 1. The fastening nut 3 is further screwed from this state. Due to an axial force (a force in the pipe axial direction: see FIG. 3) generated by this fastening force, the end of the high-pressure fuel pipe 2 (the end of the pressing section 21a) abuts against (is brought into press-contact with) the pressure receiving seat section 11a of the discharge port 1 in a state of being pressed against the pressure receiving seat section 11a of the discharge port 1. Here, certainty of sealing is secured by an abutment section Sa (a high-pressure metallic touch seal surface).

Figure 2:
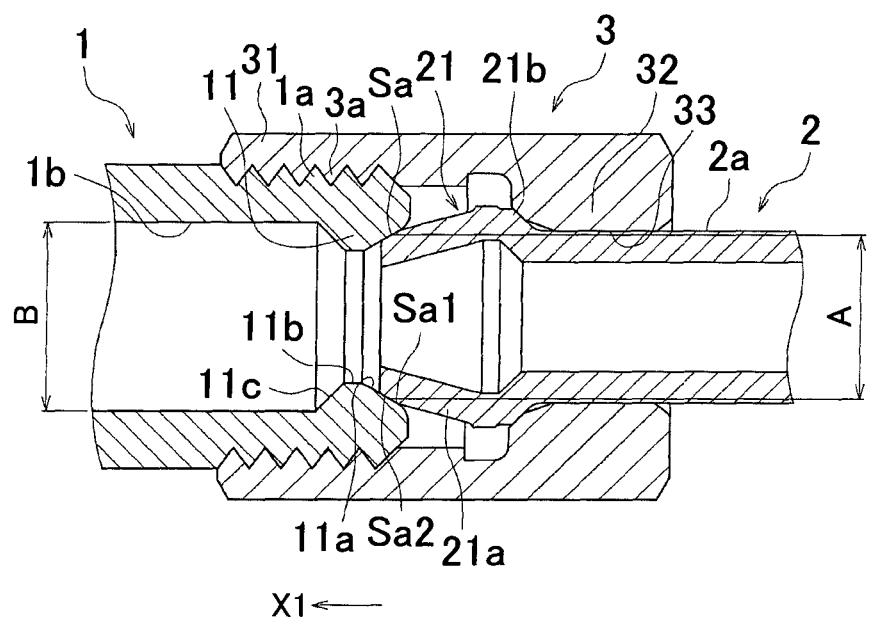
FIG. 2 is an example of a sectional view of the pipe connection structure of the invention.

In the pipe connection structure of this embodiment, as shown in FIG. 2, the abutment section Sa in which the end of the pressing section 21a of the high-pressure fuel pipe 2 and the pressure receiving seat section 11a of the discharge port 1 contact with each other is provided. A diameter A of the abutment section Sa is set to be smaller than an inner diameter B of the discharge port 1 (A<B), and the abutment section Sa is located on the radially inner side of the inner wall surface 1b of the discharge port 1. In addition, each of the first abutment surface Sa1 of the discharge port 1 and the second abutment surface Sa2 of the high-pressure fuel pipe 2 has the tapered shape. By adopting such a structure, degradation of the certainty of sealing due to a fluctuation in pressure, a fluctuation in temperature, or the like can be suppressed. A description will hereinafter be made on this point.

First, a description will be made with reference to FIG. 9, on an example of the pipe connection structure of related art in which a discharge port and a high-pressure fuel pipe of a high-pressure fuel pump are connected.

In the pipe connection structure of this example, a pressure receiving seat section 511 is provided at an end of a discharge port (made with SUS403J1L, for example) 501. The pressure receiving seat section 511 is a conical tapered surface in which a diameter thereof is radially increased from an inner wall surface 501b of the discharge port 501 toward a tip of the discharge port 501. An end of a high-pressure fuel pipe 502 (an end of a connection head section 521) abuts against this pressure receiving seat section 511, and an abutment section Sb between the pressure receiving seat section 511 and the end of the high-pressure fuel pipe 502 is located on a radially outer side of the inner wall surface 501b of the discharge port 501. In addition, an outer peripheral surface at the end of the discharge port 501 is formed with a male screw 501a. A fastening nut 503 is screwed into this male screw 501a. It should be noted that the end (of a connection side) of the high-pressure fuel pipe 502 is provided with the connection head section 521, which is similar to the connection head section in the above embodiment.

Figure 9:
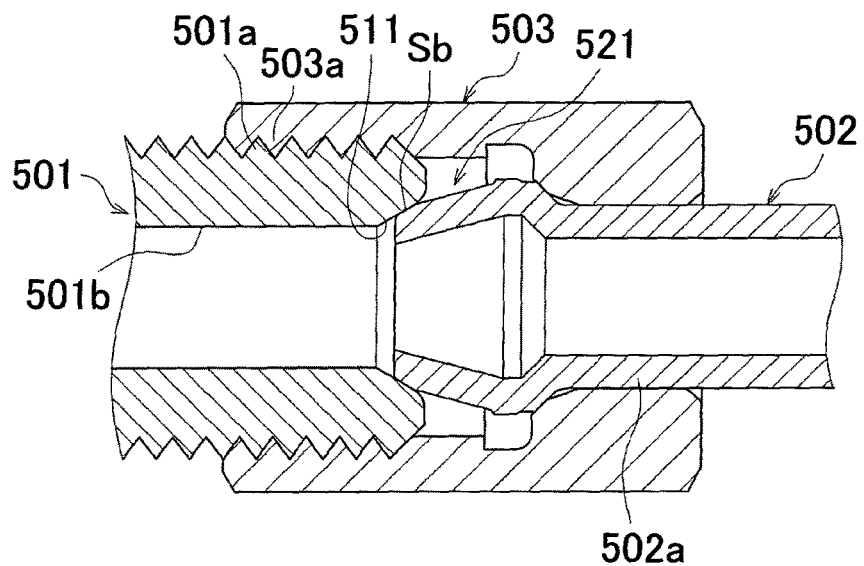
FIG. 9 is a sectional view of an example of a pipe connection structure of related art.

Also in this pipe connection structure shown in FIG. 9, the fastening nut 503 is inserted through a straight pipe section 502a of the high-pressure fuel pipe 502, and the fastening nut 503 (a female screw 503a) is screwed into the male screw 501a on the outer peripheral surface of the discharge port 501 in a state that the pressure receiving seat section 511 of the discharge port 501 faces the connection head section 521 of the high-pressure fuel pipe 502. Then, the end of the high-pressure fuel pipe 502 (the end of the connection head section 521) abuts against (is brought into press-contact with) the pressure receiving seat section 511 of the discharge port 501 in a state of being pressed against the pressure receiving seat section 511 of the discharge port 501. In this way, the discharge port 501 and the high-pressure fuel pipe 502 are connected to each other.

By the way, in the pipe connection structure of related art shown in FIG. 9, there is a case where positional misalignment (axial misalignment) occurs between the discharge port 501 and the high-pressure fuel pipe 502 when the discharge port 501 and the high-pressure fuel pipe 502 are connected to each other. At the time, there is a case where pressure that is applied to a contact portion between the pressure receiving seat section 511 of the discharge port 501 and the end of the high-pressure fuel pipe 502 (the end of the connection head section 521) is deviated and thus surface pressure of the abutment section Sb is lowered.

In addition, if plastic deformation of pipe ends (the tips of the pressure receiving seat section 511 and the connection head section 521) progresses due to the fluctuation in pressure, the fluctuation in temperature, or the like that occurs in the fuel supply passage, and a contact area of the abutment section Sb is increased, there is a case where the surface pressure of the abutment section Sb is lowered. Furthermore, if connection and disassembly of the pipe is repeatedly performed (or fastening by the fastening nut is repeatedly performed) for reassembly (service) of the high-pressure fuel pump or the like, there is a case where the plastic deformation of the pipe ends (the tips of the pressure receiving seat section 511 and the connection head section 521) progresses, and thus the surface pressure of the abutment section is lowered. Then, if lowering of the surface pressure occurs as described above, the certainty of sealing is degraded, and reliability against fuel leakage is deteriorated.

In view of the above, in order to suppress the lowering of the surface pressure of the abutment section, the discharge port 501 is manufactured by using a hard material, such as SUS440C or SUS630, in this related art. However, since an SUS material, such as SUS440C or SUS630, is a material that is not suitable for welding (a material that is sensitized), a measure against sensitization and the like needs to be taken in a process of welding the discharge port 501 to a pump housing. This results in additional cost.

In this embodiment, even when a soft material is used for the discharge port 1, the lowering of the surface pressure of the abutment section Sa due to the fluctuation in pressure, the fluctuation in temperature, or the like can be suppressed.

Figure 3:
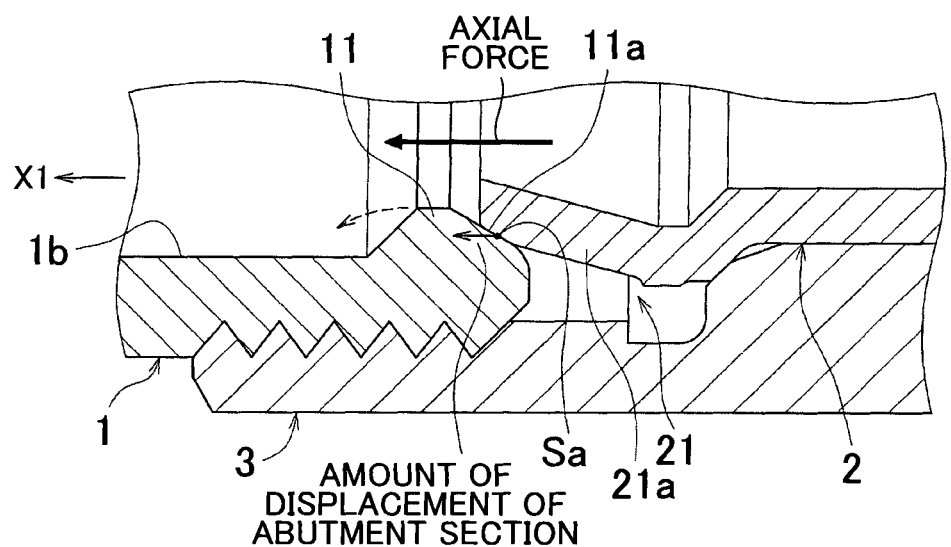
FIG. 3 is an enlarged sectional view of main components in the pipe connection structure of FIG. 2.

More specifically, in this embodiment, as shown in FIG. 2 to FIG. 4, the abutment section Sa, in which the end of the pressing section 21a of the high-pressure fuel pipe 2 abuts against the pressure receiving seat section 11a of the discharge port 1, is located on the radially inner side of the inner wall surface 1b of the discharge port 1. Thus, no component interferes with displacement of the abutment section Sa in the pipe axial direction (the X1 direction). In addition, the first abutment surface Sa1 of the discharge port 1 and the second abutment surface Sa2 of the high-pressure fuel pipe 2 are tapered surfaces, and rigidity of the sealing portion 11 (rigidity of a portion of the apex section 11b (a portion C in FIG. 4)) is low. Accordingly, the discharge port 1 is plastically deformed by the axial force that is generated due to fastening by the fastening nut 3, and the sealing portion 11 is deflected in a direction of a broken arrow shown in FIG. 3 (the abutment section Sa is displaced in the X1 direction). The discharge port 1 and the high-pressure fuel pipe 2 are connected to each other in a state that the sealing portion 11 is deflected (elastically deformed), just as described. Thus, even when the axial force is fluctuated due to the fluctuation in pressure, the fluctuation in temperature, or the like, the fluctuation in axial force (a fluctuation in surface pressure of the abutment section Sa) is absorbed by elasticity (a spring effect) of the sealing portion 11. In this way, even when a soft material (a material (for example, SUS403J1L or the like) that has substantially the same hardness as the high-pressure fuel pipe 2 (for example, iron)) is selected as the material for the discharge port 1, the plastic deformation of the pressure receiving seat section 11a of the discharge port 1 and the end of the high-pressure fuel pipe 2 (the end of the pressing section 21a) can be suppressed. Thus, the lowering of the surface pressure of the abutment section Sa between these discharge port 1 and high-pressure fuel pipe 2 can also be suppressed.

In addition, even when the surface pressure is deviated in the abutment section due to the positional misalignment between the discharge port 1 and the high-pressure fuel pipe 2 at the time of connection, such deviation is compensated by the elasticity of the sealing portion 11. Thus, the surface pressure of the abutment section Sa can be secured. Furthermore, even when fastening by the fastening nut 3 is repeated, the plastic deformation of the pressure receiving seat section 11a of the discharge port 1 and the end of the high-pressure fuel pipe 2 (the end of the pressing section 21a) can be suppressed by the elastic deformation of the sealing portion 11. Thus, also in this case, the surface pressure of the abutment section Sa can be secured.

In the pipe connection structure of this embodiment, if the pipe connection is performed by the fastening torque same as that in the pipe connection structure shown in FIG. 9, the larger axial force (a larger press-contact force) than that in the pipe connection structure in FIG. 9 can be obtained by the elastic deformation of the sealing portion 11. In this way, the surface pressure of the abutment section Sa can further be increased, and thus a high degree of the certainty of sealing can be secured.

As described so far, in the pipe connection structure of this embodiment, the lowering of the surface pressure of the abutment section Sa due to the fluctuation in pressure, the fluctuation in temperature, or the like can be suppressed. Thus, the reliability against fuel leakage is increased. In addition, as a material for the discharge port 1, a material that is reasonably priced and has the favorable weldability (for example, SUS403J1L or the like) can be selected. Furthermore, only the shape of the end of the discharge port 1 needs to be changed, and a new and additional component is not necessary. Thus, cost can be reduced.

Moreover, in the pipe connection structure of this embodiment, a portion at the sealing portion 11 of the discharge port 1 that is on a deep side of the apex section 11b has the tapered shape. Accordingly, the sealing portion 11 can easily be processed, and thus the cost can be reduced.

(Amount of displacement of the abutment section) As described above, in the pipe connection structure of this embodiment, the sealing portion 11 of the discharge port 1 is deflected by the axial force that is generated due to the fastening by the fastening nut 3, and the abutment section Sa is displaced in the X1 direction (see FIG. 3). As a result of an analysis of an amount of displacement of the abutment section Sa (an amount of displacement of the abutment section) by simulation calculations and the like, it was confirmed that, in the case where the axial force shown in FIG. 3 was 25 kN, the lowering of the surface pressure of the abutment section Sa due to the fluctuation in pressure, the fluctuation in temperature, or the like could reliably be suppressed if the amount of displacement of the abutment section Sa (see FIG. 3) with respect to the axial force of 25 kN was 50 μm or larger. Here, the analysis was conducted with the material for the discharge port 1 being SUS403J1L (estimated Hv 230 to 250) and the material for the high-pressure fuel pipe 2 being iron (Hv 250 to 260).

Figure 5:
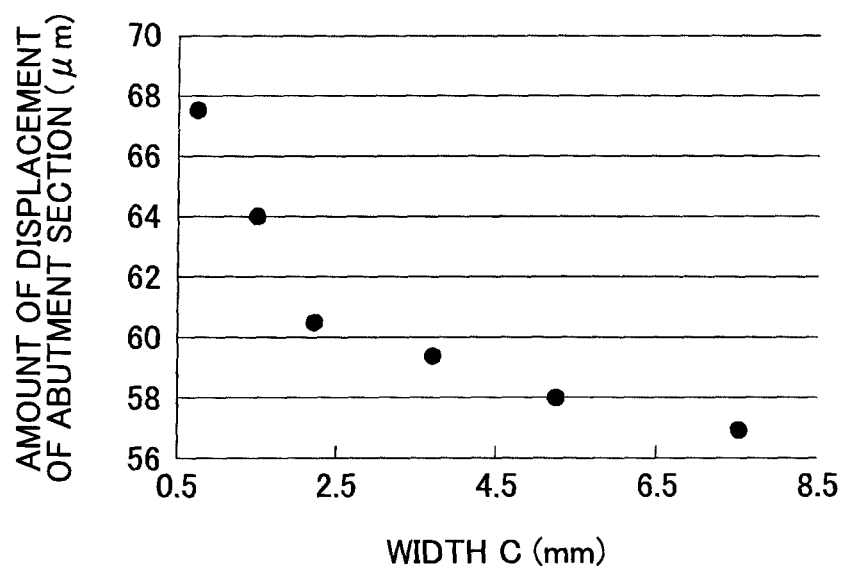
FIG. 5 is a graph of a relationship between a width dimension of an apex section of a discharge port and an amount of displacement of an abutment section.

In addition, a relationship between the width C of the apex section 11b of the sealing portion 11 (see FIG. 4) and the amount of displacement of the abutment section Sa (an amount of displacement of a sealing surface with respect to the axial force of 25 kN) was examined by simulation calculations and the like with the material for the discharge port 1 being SUS403J1L and the material for the high-pressure fuel pipe 2 being iron, and a result as shown in FIG. 5 was obtained. It is understood from this result in FIG. 5 that, in the case where the material for the discharge port 1 is SUS403J1L, the amount of displacement of the abutment section Sa can become 50 μm or larger if the width C of the apex section 11b of the sealing portion 11 is set to 7.5 mm or smaller, which is set in consideration of a safety ratio. It should be noted that, in the case where a hard material (for example, SUS440C or the like) was used as a material for the discharge port 501 in the pipe connection structure (C>9 mm) of related art, the amount of displacement of the abutment section was smaller than 50 μm.

Figure 6:
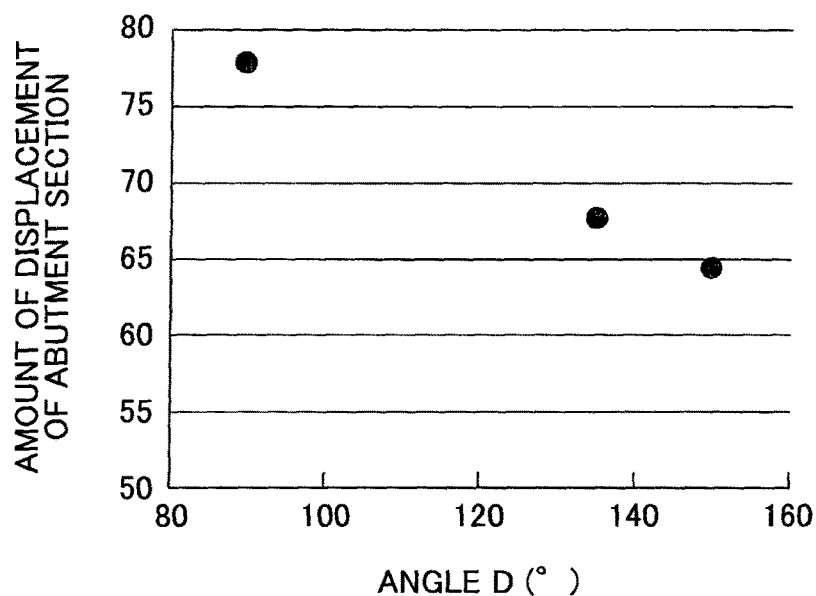
FIG. 6 is a graph of a relationship between an angle of a joint section of the discharge port and the amount of displacement of the abutment section.

Furthermore, a relationship between an angle D (see FIG. 4) that is defined by the joint section 11c (the tapered surface) of the sealing portion 11 and the inner wall surface 1b of the discharge port 1 and the amount of displacement of the abutment section Sa (the amount of displacement of the abutment section with respect to the axial force of 25 kN) was examined by simulation calculations and the like with the material for the discharge port 1 being SUS403J1L, the material for the high-pressure fuel pipe 2 being iron, and the width C of the apex section 11b of the sealing portion 11 being 7.5 mm, and a result as shown in FIG. 6 was obtained. In consideration of this result in FIG. 6 and the workability of the sealing portion 11 (the reduced cost), it can be said that the angle D is preferably set in a range between 90° and 150°.

—Another Embodiment—It should be noted that the embodiment disclosed herein is illustrative in all respects and thus does not serve as the basis for limited interpretation. Accordingly, the technical scope of the invention is not interpreted by the above embodiment only but rather defined on the basis of the scope of the claims. In addition, all modifications falling within the scope of the claims and equivalents thereof are included in the technical scope of the invention.

Figure 7:
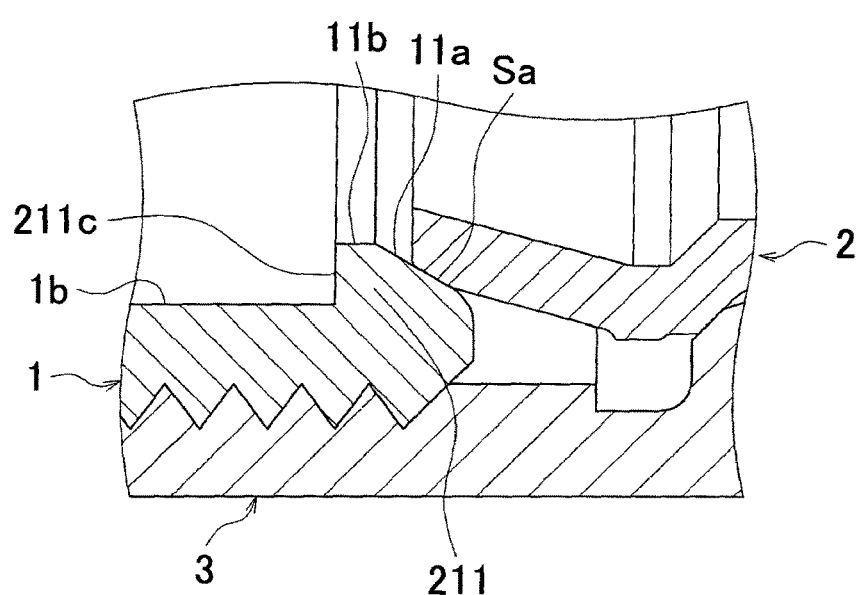
FIG. 7 is a sectional view of a modified example of an end of the discharge port.
Figure 8:
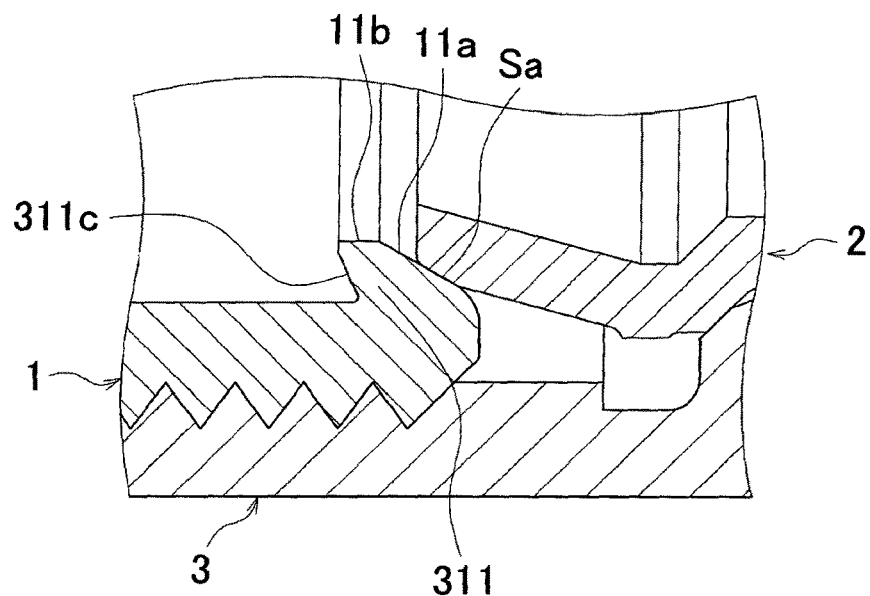
FIG. 8 is a sectional view of another modified example of the end of the discharge port.

For example, in the embodiment described above, the portion of the sealing portion 11 on the side opposite to the pressure receiving seat section 11a across the apex section 11b has the tapered shape, and an angle defined by the joint section and the inner wall surface of the first pipe member is an obtuse angle. However, the invention is not limited thereto. For example, as shown in FIG. 7, the portion on the side opposite to the pressure receiving seat section 11a across the apex section 11b may be a perpendicular section (a surface with which the angle D shown in FIG. 4 becomes) 90° 211c that has a perpendicular shape with respect to the inner wall surface 1b of the discharge port 1. Alternatively, as shown in FIG. 8, the portion on the side opposite to the pressure receiving seat section 11a across the apex section 11b may be an inclined section (a tapered surface) 311c that has an inclined shape toward the apex section 11b side, and an angle defined by the joint section and the inner wall surface of the first pipe member is an acute angle. If a structure shown in either one of these FIG. 7 and FIG. 8 is adopted, rigidity of either one of ends 211, 311 is lowered in comparison with the structure in the above embodiment. Thus, the amount of displacement of the abutment section Sa can be increased.

In the embodiment described above, a mechanism that combines the male screw 1a on the outer peripheral surface of the discharge port 1 and the fastening nut 3 is used as pressing means for pressing the end of the discharge port 1 (the first pipe member) against the end of the high-pressure fuel pipe 2 (the second pipe member). However, the invention is not limited thereto. For example, another mechanism such as a V clamp (a mechanism for obtaining a specified fastening force by bringing a pair of metallic clamp members formed in substantially semi-arcuate shapes to each other by using a bolt and nut: see Japanese Patent Application Publication No. 2011-106303 (JP 2011-106303 A), for example) may be used as the pressing means, so as to press the two pipe members against each other.

In the embodiment described above, a description has been made on the example that the invention is applied to the connection of the discharge port 1 and the high-pressure fuel pipe 2 of the high-pressure fuel pump 100. However, the invention is not limited thereto. The invention can also be applied to connection of a low-pressure fuel pipe. Furthermore, the invention is not limited to application for the fuel pipe and can be applied to connection of a pipe for transporting another type of fluid.

The invention can effectively be used for connection of a pipe such as a fuel pipe of an internal combustion engine (an engine).

What is claimed is:
1. A pipe connection structure comprising:
  a first pipe member,
  an sealing portion of the first pipe member including a first abutment surface in a tapered shape, a diameter of the first abutment surface being increased toward a tip of the first pipe member, the sealing portion being configured to project radially inward from an inner wall surface of the first pipe member, the inner wall surface being adjacent to the sealing portion; and
  a second pipe member, an end of the second pipe member including a second abutment surface in a tapered shape, a diameter of the second abutment surface being reduced toward a tip of the second pipe member, the second abutment surface abutting against the first abutment surface by being pressed, the first abutment surface and the second abutment surface abutting against each other at an abutment section, the abutment section being located on a radially inner side of the inner wall surface of the first pipe member, wherein:

the first pipe member and the sealing portion are constructed as a single piece, the first pipe member and the second pipe member are connected by being pressed against each other in an axial direction of the first pipe member and the second pipe member, such that the sealing portion is deflected by elastic deformation in the axial direction, and the sealing portion includes:

a pressure receiving seat section including the first abutment surface and abutting against the second abutment surface;

an apex section being a radially innermost section of the sealing portion, the apex section being adjacent to the pressure receiving seat section and extending in the axial direction of the first pipe member; and a joint section being adjacent to the apex section, the joint section being located on a side opposite to the pressure receiving seat section across the apex section, and the joint section extending from the radially innermost portion of the inner wall of the inner wall surface at an angle greater than or equal to 90 degrees.

2. The pipe connection structure according to claim 1, wherein the sealing portion of the first pipe member is annular.

3. The pipe connection structure according to claim 2, wherein:

the first pipe member is a discharge port of a high-pressure fuel pump used for an engine of in-cylinder direct-injection type, and the second pipe member is a high-pressure fuel pipe that connects the discharge port and a delivery pipe.

4. The pipe connection structure according to claim 1, wherein:

the first pipe member is a discharge port of a high-pressure fuel pump used for an engine of in-cylinder direct-injection type, and the second pipe member is a high-pressure fuel pipe that connects the discharge port and a delivery pipe.

* * * * *